Patented Oct. 15, 1929

1,731,699

UNITED STATES PATENT OFFICE

ITALO CAVALLI, OF PADUA, ITALY

PROCESS FOR THE EXTRACTION OF MERCURY FROM ITS ORES AND FROM RESIDUES OF THEIR ROASTING

No Drawing. Application filed September 22, 1927, Serial No. 221,405, and in Italy September 24, 1926.

Processes of obtaining mercury from its ores are almost always carried out by roasting and distilling the mercury.

Rich ores are distilled in retorts, shaft-furnaces, flame-furnaces etc., with the addition of desulphurizing substances (lime, limestone, iron etc.) and the mercury vapours evolving from the furnaces are condensed in pipes or chamber systems. The poorer the ores are, the greater will be the losses, so that rarely are ores having an amount of mercury of about 0.5% treated. A concentration of these poor ores appears easy and opportune, but the wet process, such as is generally performed at present, can utilize only a dry material (a maximum of 4% of moisture is tolerated) in ores of determined size. On the contrary the concentration of ores poor in mercury, which are often the very fine infiltrations of cinnabar or of metallic mercury in banks of limestone or clay, can be made only on a very finely powdered material.

The process, in virtue of the high density of the cinnabar and of the mercury in respect to the density of the limestone and of the clay does not present, in the greater number of the cases, particular drawbacks. This concentrated and finely powdered material, when dried, could not be utilized in the customary furnaces, because it would descend too rapidly without attaining the necessary temperature, thereby obstructing the furnaces. On the other hand it would be not rich enough to be distilled in retort furnaces.

All the dry processes for extracting mercury offer the serious drawback of being very dangerous to the health of the workmen owing to the poisonous and insidious action of the heavy mercury vapours which can escape from the apparatus.

The wet methods surely obviate this danger, and give the best conditions for utilizing the wet and very finely powdered concentrate, as above stated.

For bringing the cinnabar into solution, it has been suggested to use an alkaline sulphide solution containing an alkaline hydrate (Vortmann) or a calcium sulphydrate solution (Engelhardt & Nettel U. S. P. 568,843), but these propositions are not practical.

In order for a method of wet extraction of the mercury from concentrates to be industrially advantageous, it is necessary: (1) that the cost of the solvent be low: (2) that the solvent be recovered; (3) that the dissolution of the cinnabar be rapid and complete; (4) that rapid and complete be also the separation of the metal.

I have found that ores poor in mercury and wastes may be advantageously utilized even when the original mercury content is only 0.2%. These ores powdered and concentrated by hydraulic separation to 1/4, 1/5 of their weight, when treated with a sodium hypochlorite solution (which can be advantageously obtained by electrolysis, give their mercury to the solution owing to the oxidation of the sulphur into sulphate:

$$HgS + 4NaOCl \rightarrow HgSO_4 + 4NaCl$$

For practically carrying out this operation the mercury containing materials are put, for instance, in vessels provided with a stirrer. To obtain a complete exhaustion of the hypochlorite solution it may be passed into a vessel containing a material already about demercurized, and causing the same to leave the vessel which has been charged with fresh material. The solutions containing the mercury as mercuric salt can be treated in various manners. When for instance red mercuric sulphide is to be prepared, the mercuric solution may be precipitated by means of the necessary quantity of sodium sulphide. Black mercury sulphide precipitate is separated from the solution going to the purification. Of course, from the sulphide which has been obtained the mercury can be extracted.

It is possible also to separate the metallic mercury with copper, eliminating the copper with dissolved iron and passing the solution to the purification. Finally it is possible to recover the mercury from the solutions by electrolysis.

The purification of the demercurized solutions from the nonalkaline metals and from the sulphates can be performed in the same manner as are purified the sodium chloride solutions to be electrolyzed. When the solution is purified, the hypochlorite serving to lixiviate the minerals can be removed by electrolysis.

A 10% sodium chloride solution, for instance, can be used to obtain solutions containing 1 kg./m$^3$ of active chlorine.

Having now particularly described and ascertained the nature of my said invention and in what manner the same is to be performed I declare that what I claim is:

1. In the process of extracting mercury from ores and waste materials containing the same, the step which comprises subjecting the ore or waste material to the action of an alkali metal hypochlorite solution.

2. In the process of extracting mercury from ores and waste materials containing the same, the steps which comprise concentrating the ore or waste material hydraulically and subjecting the concentrate so obtained to the action of a solution of an alkali metal hypochlorite.

3. In the process of extracting mercury from ores and waste materials containing the same, the step which comprises subjecting the ore or waste material to the action of a solution of sodium hypochlorite.

4. In the process of extracting mercury from ores and waste materials containing the same, the steps which comprise concentrating the ore or waste material hydraulically, and subjecting the concentrate so obtained to the action of a solution of sodium hypochlorite.

In testimony whereof I have hereunto signed my name.

ITALO CAVALLI.